__United States Patent Office__

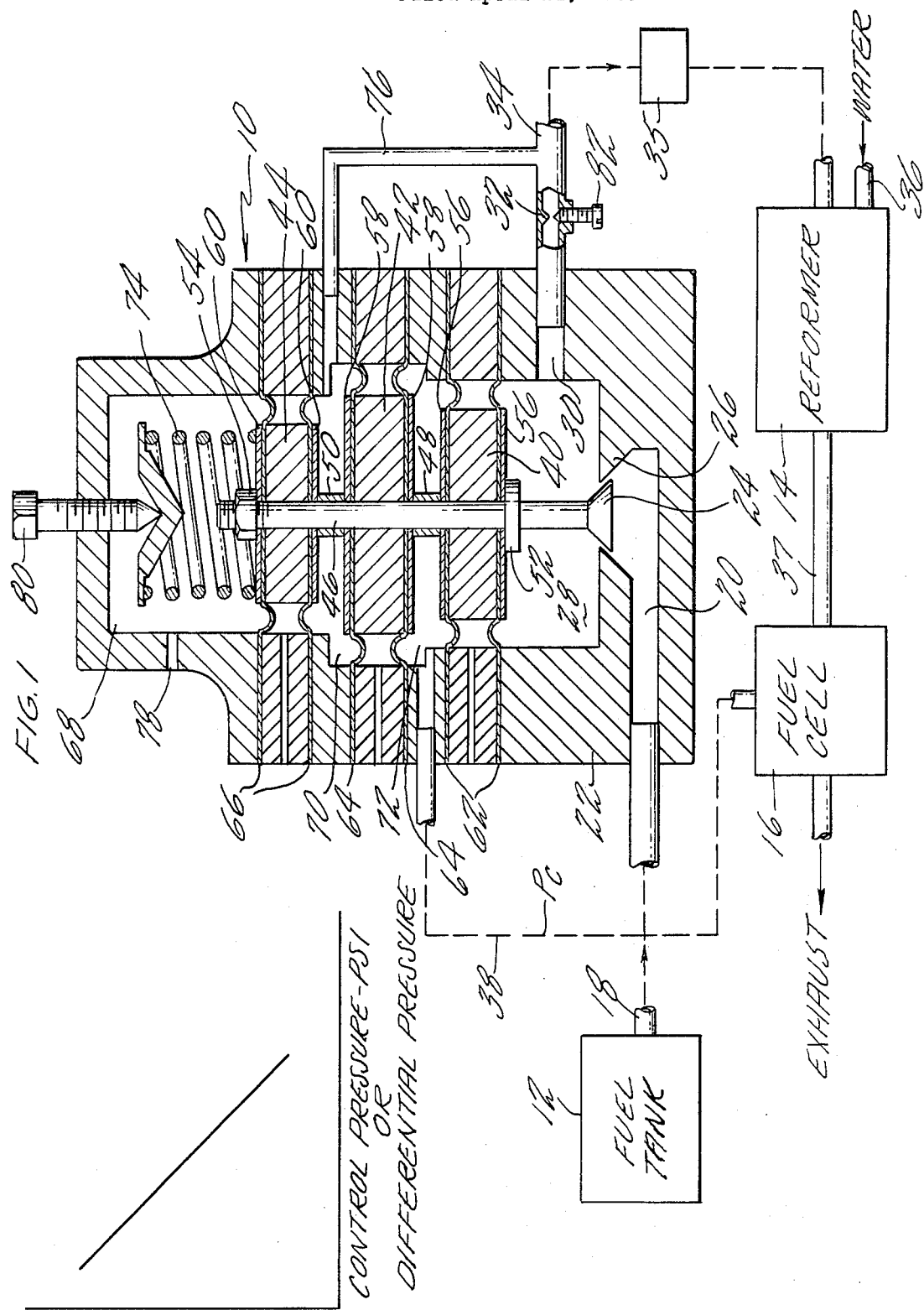

3,668,013
Patented June 6, 1972

3,668,013
FUEL CELL SYSTEM WITH PNEUMATIC
FUEL FLOW CONTROL
Thomas C. Franz, Bolton, Conn., assignor to United
Aircraft Corporation, East Hartford, Conn.
Filed Apr. 21, 1969, Ser. No. 817,697
Int. Cl. H01m 27/02; G05d 11/02
U.S. Cl. 136—86 B                              5 Claims

ABSTRACT OF THE DISCLOSURE

A control is disclosed for automatically metering fluid flow as a function of the difference between two pressures or of a single pressure. A restriction is disposed in the fluid outlet line so that the metered flow will depend upon pressure differential across the restriction. The pressure upstream of the restriction is regulated by a valve in the supply line activated by a computing diaphragm assembly consisting essentially of three spaced interconnected disc elements responsive to the difference between the two pressures or a single control pressure when one of the pressures is fixed.

BACKGROUND OF THE INVENTION

This invention relates to fluid metering controls and more specifically pertains to an improved control intended to automatically regulate fluid flow as a function of the difference between two control pressures or of a single control pressure.

Because of a desire to produce electrical current from relatively small inexpensive power plants, there have been considerable efforts expended in the area of fuel cells to develop a commercially attractive system. It has been proposed to employ a system wherein a carbonaceous fuel is admixed with water and initially passed through a catalytic reformer to reform the feedstock to a hydrogen containing stream. Subsequently, the hydrogen may be separated from the stream and used as the fuel in the anode compartments of a fuel cell; or the gaseous effluent from the reformer may be used directly in the fuel cell depending upon the fuel cell design. In the steam reforming process, natural gas, for example, reacts with steam at high temperatures in the presence of a catalyst to form hydrogen and other gases. For fuel cells which can operate directly from the hydrogen-rich gases generated from the steam-reformed process, the reforming process can be carried out at a pressure only slightly above ambient pressure. For fuel cells which require ultra-pure hydrogen, the pure hydrogen can be obtained by diffusion of the hydrogen through thin palladium-silver membranes. In operation, the fuel cell is a demand system and the reformer must replenish the fuel supply at the fuel electrodes. If the fuel supply is below that required by the fuel cell, a signal must be transmitted to the source of fuel to supply an increasing amount of fuel to the reformer. The presently utilized control incorporates a pressure transducer, a servo amplifier, a motor-actuated valve and a variable area orifice which is complex, expensive, and sensitive to manufacturing tolerances. In addition, the current approach is bulky and consumes power.

SUMMARY OF THE INVENTION

It is an object of this invention to automatically meter fluid to a system as a function of a pressure differential or of a single signal pressure.

Another object of this invention is the provision of a pressure actuated liquid or gas metering control consisting essentially of a pneumatically or hydraulically actuated inlet supply valve, a computing diaphragm assembly, and a metering orifice. A feature of this device lies in its insensitivity to supply pressure variations while metering flow. Another aspect of the invention lies in its particular suitability to control of methane flow to a fuel cell reformer.

In accordance with this invention, a restriction is placed in the control outlet line so that the flow from the supply chamber depends upon the pressure differential across the restriction. A computing diaphragm assembly, consisting of three spaced interconnected disc elements, is provided within the control for the purpose of positioning an inlet supply valve responsive primarily to a pressure differential. Either of the pressures may be fixed, as by venting to ambient, so that fluid flow can be controlled by a single pressure. The selection of the disc/diaphragm effective areas is an important aspect of the invention. While this control is particularly suitable for controlling the methane flow to a fuel cell reformer, it is evident that the technique applies equally well to other systems and extends to liquid flow regulators. Flow can be made to increase or decrease with increasing or decreasing signal pressure or differential pressure, depending upon the orientation of the valve in the inlet line or depending on the selection of the single control pressure.

Other objects and advantages of the present invention will become more apparent from the following detailed description of a preferred embodiment thereof and from the accompanying drawings.

BRIEF DESCRIPTION OF THE DRAWINGS

FIG. 1 is a schematic of a fuel cell system having a control embodying the features of this invention.

FIG. 2 graphically presents a typical operating schedule obtained through the use of this fluid metering in the fuel cell environment.

DESCRIPTION OF THE PREFERRED EMBODIMENT

As may be seen in FIG. 1, a pressure-actuated fluid metering control is shown generally as 10 and is incorporated into a fuel cell system shown as a fuel tank 12, a reformer 14, and a fuel cell 16. Fuel is supplied through conduit 18 to the fluid inlet 20 of the control housing 22. A valve shown as a plug 24 in a nozzle 26 restricts the flow from the inlet passage into a first chamber 28. Chamber 28 is vented by outlet 30 past a restriction 32 which may be a laminar flow restrictor, an orifice or similar device. Thereafter, the flow is directed to a fuel reformer 14 through conduit 34. For gaseous flow control, if the reforming process is accomplished at variable pressure conditions, a back pressure regulator 35 in conduit 34 maintains a constant pressure downstream of restriction 32. This is not required for liquid flow controlling. Water is supplied to the reformer through conduit 36. Within the reformer, the fuel is steam reformed in the presence of a suitable catalyst by the addition of heat to form hydrogen, carbon-monoxide, carbon-dioxide and other residual gases. The reformed fuel or hydrogen is directed to the fuel cell through conduit 37. Within the fuel cell, there may be a plenum chamber supplying fuel to each individual cell within the fuel cell module. A representative hydrogen signal pressure, for example the pressure in the plenum, is selected and directed through conduit 38 to the control 10.

The housing 22 of the control is broken up into a number of sections for purposes of illustration and ease of assembly. Within the housing, essentially centrally located, is a computing diaphragm assembly consisting of a first disc 40, a second isc 42, and a third disc 44 interconnected by means of a central rod 46 and separated by spacers 48 and 50. The spacers 48 and 50 cooperate with flange 52 and nut 54 to locate the discs with respect to each other and to hold retention plates 56, 58 and 60 against the discs 40, 42 and 44 respectively. The retention plates 56, 58 and 60 securely hold diaphragms 62, 64 and 66 against the discs. The outer peripheries of the diaphragms are securely retained by abutting flanges of the housing 22. A first chamber 28 is formed essentially by the first disc 40 and the housing, and a second chamber 68 is formed essentially by the housing and the third disc 44. Between the discs are chambers 70 and 72. The chambers surrounding each disc are vented.

As is apparent from the drawing, each disc has a different effective area which is dependent upon the diameter of each disc and a portion of the cooperating diaphragms. Disc as used herein includes the overlying diaphragms and close fitting pistons could replace the disc/diaphragm arrangement.

In operation, fuel is supplied to chamber 28 past the plug 24. Thereafter, the fuel flows past the restriction 32 to the reformer 14 and to the fuel cell 16. The amount of flow passing the restriction is dependent upon the pressure differential across the restriction which is the pressure in chamber 28 less the pressure in conduit 34. Flow continually drains from chamber 28 and the pressure differential across the restriction can be adjusted by varying the position of plug 24 to change the pressure in chamber 28. The pressures on the diaphragm assembly, particularly the external control pressure in chambers 68 and 72, dictate the position of the plug 24. The pressure downstream of the restriction is directed to chamber 70 by conduit 76. The computing diaphragm assembly moves to maintain a force-balance condition as the control pressure in chamber 72 varies, as occurs if the pressure in chamber 68 is vented to ambient through opening 78. As control pressure from conduit 38 increases, the pressure in chamber 72 increases moving the piston assembly upward closing the inlet valve causing pressure in chamber 28 to decrease. This results in a decrease in flow. Similarly, decreases in the control pressure from conduit 38 cause a decrease in pressure in chamber 72 causing the diaphragm assembly to move downward thereby opening the valve allowing more fuel to enter chamber 28 resulting in increases in flow to the reformer and to the cell. If the area of the third disc is equal to the difference of the areas of the first and second discs, it can be shown that:

$$W = Kf\left[\frac{Fs}{A_1} + (P_c - P_a)\frac{(A_1 - A_2)}{A_1}\right]$$

where:

W = fluid weight flow
K = flow characteristic constant of metering restrictor 32
f = function of
Fs = spring preload force
$A_1$ = area of the first disc 40
$A_2$ = area of the second disc 42
$P_c$ = signal or control pressure in chamber 72
$P_a$ = ambient pressure in chamber 68

The weight flow is dependent upon the control pressure in chamber 72; and the flow can be varied by the proper selection of the metering orifice characteristics, diaphragm area ratios and the spring forces.

Valve performance is presented in FIG. 2 and indicates that as control pressure increases, flow decreases. The zero pressure intercept of the curve can be adjusted by adjusting the spring 74 through the external adjustment means 80, and the slope of the curve may be adjusted by adjustment of the metering restriction 32 with the adjustment means 82.

This control device is intended primarily for a fuel cell system operating on methane gas. Although this device functions most satisfactorily as a pneumatic control, tests have been run with liquids. These tests have shown that the system will control liquid flows and control response is almost instantaneous. Also, if fluid flow control as a function of the difference of two pressures is required, $P_a$ can be the second independent controlling pressure. To reverse the flow schedule, $P_a$ can be the single control pressure or the valve in control inlet can be reversed.

Although the invention has been shown and described with respect to a preferred embodiment, it should be understood by those skilled in the art that various changes and omissions in the form and detail may be made therein without departing from the spirit and scope of the invention.

I claim:

1. In a fuel cell system, a pneumatic control for automatically metering the gaseous fuel flow to the reformer essentially as a function of the fuel cell fuel pressure, which comprises:
   a housing having a gas inlet passage to a first chamber and a gas outlet passage from the first chamber;
   a reformer in fluid communication with said gas outlet passage from the first chamber;
   a fuel cell in fluid communication with said reformer and downstream thereof;
   a valve, including means for varying the valve flow area, disposed in the inlet passage;
   a computing diaphragm assembly consisting of three spaced, interconnected, disc elements having overlying flexible diaphragms fixed to the housing, the diaphragm assembly positioning the means for varying the valve flow area, the first disc defining with the housing the first chamber and the third disc defining with the housing a second chamber;
   a restriction downstream of the first chamber metering the gas flow from the chamber dependent upon the pressure differential across the restriction;
   means for directing the fuel cell fuel pressure to the space between the first and second disc elements;
   means for directing a signal pressure to said second chamber so that the control meters flow as a function of the difference in the fuel cell fuel pressure and the signal pressure; and
   means for directing the gas pressure downstream of the restriction to the space between the second the third disc elements.

2. A fuel cell system as defined in claim 1, wherein the effective area of the third disc is equal to the effective areas of the second disc less the effective area of the first disc and including means for providing a preset spring force on the diaphragm assembly.

3. A fuel cell system as defined in claim 2, including a back pressure regulator in the conduit between the restriction and the reformer.

4. A fuel cell system as defined in claim 1, wherein said signal pressure is ambient pressure so that the control is essentially dependent upon changes in the fuel cell fuel pressure.

5. A fuel cell system as defined in claim 4, wherein said valve including means for varying the flow area of the valve comprises a nozzle and a plug disposed therein so that a decrease in the fuel cell fuel pressure results in an increase in fuel flow.

References Cited

UNITED STATES PATENTS

| | | | |
|---|---|---|---|
| 3,087,004 | 4/1963 | Thorsheim | 136—86 |
| 3,098,768 | 7/1963 | Titterington et al. | 136—86 |
| 3,106,494 | 10/1963 | Thorsheim | 136—86 |
| 3,368,923 | 2/1968 | Smith | 136—86 |
| 3,453,146 | 7/1969 | Bawa et al. | |

ALLEN B. CURTIS, Primary Examiner

U.S. Cl. X.R.

137—98